US011755632B2

United States Patent
Winzenried et al.

(10) Patent No.: US 11,755,632 B2
(45) Date of Patent: *Sep. 12, 2023

(54) CLASSIFIER SYSTEM AND METHOD (71) Applicant: JANZZ Ltd, Zurich (CH)

(72) Inventors: Stefan Winzenried, Kilchberg (CH); Adrian Hossu, St. Gallen (CH)

(73) Assignee: JANZZ LTD, Zurich (CH)

( * ) Notice: Subject to any disclaimer, the term of this patent is extended or adjusted under 35 U.S.C. 154(b) by 168 days.

This patent is subject to a terminal disclaimer.

(21) Appl. No.: 17/468,347

(22) Filed: Sep. 7, 2021

(65) Prior Publication Data

US 2022/0027394 A1  Jan. 27, 2022

Related U.S. Application Data (63) Continuation of application No. 16/045,902, filed on Jul. 26, 2018, now Pat. No. 11,113,324.

(51) Int. Cl.
*G06F 7/00* (2006.01)
*G06F 16/33* (2019.01)
(Continued)

(52) U.S. Cl.
CPC .......... *G06F 16/334* (2019.01); *G06F 16/285* (2019.01); *G06N 20/00* (2019.01)

(58) Field of Classification Search
CPC ...... G06F 16/334; G06F 16/285; G06N 20/00
(Continued)

(56) References Cited

U.S. PATENT DOCUMENTS

| 7,542,958 | B1 | 6/2009 | Warren et al. |
| 2009/0083231 | A1* | 3/2009 | Eberholst ............... G16H 10/60 707/999.102 |
| 2014/0279622 | A1 | 9/2014 | Lamoureux et al. |

FOREIGN PATENT DOCUMENTS

WO    2012122122 A1    9/2012

OTHER PUBLICATIONS

Janzz. Technology: "JANZZclassifier!", Jun. 30, 2017 (Jun. 30, 2017), pp. 1-2, XP055627494, Retrieved from the Internet: URL:https://web.archive.org/web/20170630102009/https://janzz.technology/our-products/janzzclassifier/ [retrieved on Oct. 1, 2019].

(Continued)

*Primary Examiner* — Isaac M Woo
(74) *Attorney, Agent, or Firm* — Leason Ellis LLP (57) ABSTRACT

Disclosed herein are systems and methods for classifying unstructured datasets according to a classification system and generating an enhanced, classified and structured dataset enabling efficient supplemental computer-based processing. The exemplary computer-implemented classification algorithms involve, for each entry in the input dataset, semantically interpreting a text-based occupation description, analyzing the description according to an ontology of interrelated "concepts" and identifying semantically relevant concept(s) and any associated descriptors specific to the classification system. The system is also configured to expand the list of relevant concepts to include concepts that bear a relationship thereto, scoring the various concepts and associated descriptors and identifying the concept(s) and descriptors that most accurately correspond to the input data. Further, the system is configured to generate the new structured and classified occupation dataset by selectively combining certain input data and augmenting each entry with (Continued)

supplemental information inferred through the classification process.

10 Claims, 7 Drawing Sheets

(51) Int. Cl.
*G06F 16/28* (2019.01)
*G06N 20/00* (2019.01)

(58) Field of Classification Search
USPC .................................................. 707/600–899
See application file for complete search history.

(56) References Cited

OTHER PUBLICATIONS

European Search Report corresponding to European Patent Application No. 19186111, 11 pages.
Examination Report in Corresponding Indian Application No. 201914027927 dated Mar. 21, 2022.

* cited by examiner

| C1 | |
|---|---|
| NAICS | 541511 |
| EEO1: | Engineers |
| Score: | 500 ↑ 750 |
| ECIC: | 350 ↓ 500 |

392 ↓

| C8 | |
|---|---|
| NAICS | 335632 |
| EEO1: | Professional |
| Score: | 50 ↓ 25 |
| ECIC: | 400 ↓ 350 |

Sorted Scores
Concept:
C1 : 750    100%
C5 : 200    26%
C7 : 200    26%
C8 : 25     3%
...

ECIC:
123 : 500   100%
456 : 350   70%
789 : 40    8%
...

FIG. 3G

CLASSIFIER SYSTEM AND METHOD

TECHNICAL FIELD OF THE INVENTION

This patent application relates generally to the field of electronic information classification and storage, and, in particular, to computer-implemented systems, methods, and computer program products for converting unstructured data into standardized and structured data through classification, thereby implicitly providing additional information inferred from a context aware, semantic analysis. Such unstructured information may comprise difficult to interpret textual information related to the field of occupational data in form of single Unicode text string expressions (e.g. single terms, free text or plaintext) or unstructured data sets containing such information.

BACKGROUND OF THE DISCLOSURE

In the wake of the digital revolution, the amount of data being collected is increasing exponentially and therefore becoming ever more complex. The significance of data and its effective analysis is thus increasing at a rapidly increasing rate.

Importantly, in order to conduct compelling analyses and to draw significant conclusions, big data is not enough. While big data provides an immense repository of information, it is not suitable to deliver answers in and of itself. The mass of data requires semantic structure to enable effective and efficient analysis of such information. Put differently, the data should be "intelligent" or "smart" data, which is structured semantically to facilitate deeper analysis and allows for more meaningful insights to be drawn from the analysis of the data.

Occupational data is just one example of big data that is collected by companies, governments and organizations (generally referred to as "organizations") across the globe. These organizations implement a myriad of disparate and inconsistent standards, rules and conventions that commonly vary across organizations and are inconsistently applied even within a given organization. Accordingly, occupational data often does not lend itself to analysis such as benchmarking, matching or statistical analyses within the same organization and, much less, across different organizations. Furthermore, existing methodologies for normalizing unstructured or semi-structured sets of occupational data are ineffective and inefficient. Ineffective because even advanced searches using the keyword-based approach lack the necessary contextual and global understanding of a human expert stored in an ontology, while simultaneously inefficient because they often include manual steps, which is time costly and prone to errors.

Accordingly, what is needed are improved systems and methods for translating and enhancing raw, unstructured or semi-structured sets of occupational information into more meaningful, classified, information sets that are suitable for data-analytics processes. It is with respect to these and other considerations that the disclosure made herein is presented.

SUMMARY OF CERTAIN EMBODIMENTS OF THE DISCLOSURE

According to a first aspect, a method for classifying an unstructured data set according to a classification system is provided to generate an enhanced, classified and structured data-set that enables efficient supplemental computer-based processing. In particular, for each item of unstructured data in the unstructured data set, the method includes the step of interpreting a given item of unstructured data in the unstructured data set, wherein the given item includes a semantic description. The method also includes the step of analyzing at least the semantic description in accordance with an ontology of occupational concepts to identify a list of one or more concepts related to the given item. The method also includes the steps of expanding the list of concepts to include other concepts that have a salient relationship to the previously identified concepts in the list to generate an expanded list and determining, from the expanded list, one or more concepts that most accurately correspond to the given item. In addition, the method includes the step of recording at least one of the one or more determined concepts as an entry in a classified occupation data-set such that each entry in the classified data set is structured in accordance with standards prescribed by a given classification system of interest.

According to another aspect, a system for classifying an unstructured data set according to a classification system is provided to generate an enhanced, classified and structured data-set that enables efficient supplemental computer-based processing. The system comprises a non-transitory computer-readable storage medium and a processor configured by executing one or more software modules including instructions in the form of code stored in the storage medium. In particular, the modules include a database module that configures the processor to access respective items of unstructured data in the unstructured data set, an ontology of occupational concepts and standards prescribed by a given classification system of interest. Also included is an interpretation module that configures the processor to interpret a given item of unstructured data in the unstructured data set, wherein the given item includes at least a semantic description. Furthermore the modules include a classification module that configures the processor to perform operations including analyzing at least the semantic description in accordance with the ontology of occupational concepts to identify a list of one or more concepts related to the given item and expanding the list of concepts to include other concepts that have a salient relationship to the previously identified concepts in the list so as to generate an expanded list. In addition, the classification module further configures the processor to determine, from the expanded list, one or more concepts that most accurately correspond to the given item. Moreover, the database module further configures the processor to record the one or more determined concepts as an entry in a classified occupation data-set such that each entry in the classified data set is structured in accordance with standards prescribed by a given classification system of interest.

These and other aspects, features, and advantages can be appreciated from the accompanying description of certain embodiments of the invention and the accompanying drawing figures.

DETAILED DESCRIPTION OF CERTAIN EMBODIMENTS OF THE INVENTION

By way of overview and introduction, the present disclosure details systems and methods for translating unstructured or semi-structured data sets according to one or more classification standards to generate an enhanced, classified and structured data-set that is suitable for computer-based processing. In one practical application further described herein, the data that is input into the exemplary systems and methods described herein consists of one or more sets of occupation related data, such as occupation titles, skills, function, industry and the like.

The sets of occupation data are typically complex data sets that are unstructured or semi-structured and not specific to a particular standardized classification system associated with a corresponding taxonomy. Each set of occupation data is semantically interpreted and analyzed in view of a given standardized classification system for the purpose of identifying one or more defined, standardized "concepts" from the classification system that best match a given set of occupation data. Furthermore, the exemplary systems and methods are further configured to convert the unclassified data-sets into structured records of standardized occupation data, wherein the occupation descriptions are expressed according to one or more prescribed classification systems. Furthermore, sets of occupation data can be augmented or enhanced by intelligently annotating the data with additional, standardized, occupation data inferred from the analysis.

Accordingly, it can be appreciated that, through the specific technical solution described herein for classification and standardization, the disclosed embodiments translate unstructured and unstandardized information sets, which are, due to their inconsistent and uncategorized nature, not suitable for analysis using existing data-processing and analytical systems, into more meaningful information sets that are structured and defined according to any of a number of defined classification systems. Thus, the disclosed embodiments are specifically configured to generate new and enhanced sets of occupational data that are more suitable for further data-analytics processes, such as benchmarking, matching or statistical analyses; the generated data enables deeper and more meaningful insights to be drawn therefrom. The disclosed embodiments can similarly be used to analyze and translate (e.g., "classify") occupation data that is already standardized according to one particular classification system into a different classification system, to facilitate further processing.

The automated solution provided in accordance with embodiments of the invention provides efficiency in the fields of data storage and data analysis, specifically, classification, and a more optimized use of computer resources necessary as part of the analytical process. This automated solution, rooted amongst a computer and network-centric arrangement including, by a hardware processor and other machine interaction over a network, facilitates the creation of occupational data sets through the algorithmic analysis of the unstructured received information, selective recordation or translation of information contained therein according to specific classification systems and related criteria, and further augmentation of the received information, which thereby transforms unclassified and unstructured information concerning occupation descriptions into sets of appropriate, standardized occupation information that is in a condition for deeper analysis and processing.

"Occupation data" or job data refers to, according to certain embodiments, a general term for related data in the field of occupation and professional concepts such as job titles, competences, soft and transversal skills, functions, specializations, education/qualification data, etc.

Occupation classifications are classification systems to structure occupations according to different attributes and characteristics. An example for this is the International Standard Occupation Classification (ISCO), developed by the International Labor Organization (ILO) for the first time in the 1960s as an international classification system of occupation groups. It has been adapted twice to the changes in the working environment in the industrial nations in 1988 and 2008 (ISCO-88 and ISCO-08). Based on this classification, international comparison enables the determination of different positions in a society's hierarchy, including comparable statistics about different labor markets, education systems, unemployment rates, etc. There are nine main occupation categories (without armed forces occupations) in the International Standard Classification of Occupations of 1988 by the International Labor Organization (ILO). These main occupation categories are organized into occupation groups, sub-groups and types, which leads to a four-digit code for each occupation to enable assigning it to an occupation type.

Additional to ISCO, there are other classification systems in use, e.g. the Standard Occupational Classification (SOC) 2010 in the UK and Ireland. SOC has its own structure, which is not based on ISCO-08. However, a mapping to ISCO-08 is available, which enables comparison between the two classification systems. Other national classification systems such as NOC (Canada) are based on ISCO. The Occupational Information Network (O*Net) in the USA is supported by the US Department of Labor/Employment and Training Administration (USDOL/ETA). It is related to the UK occupation classification SOC. O*Net is a broad database of occupation descriptions and the respective skills, competences, etc. needed for each of them. Each occupation is structured into Tasks, Tools used, Knowledge, Skills, Ability, Work Activities, Work Context, Job Zone. Additional important classification systems exist in various regions and countries worldwide, e.g. ANZSCO, ASCO, BO&C, KldB, Ö-ISCO, and many more.

Figure 3A:
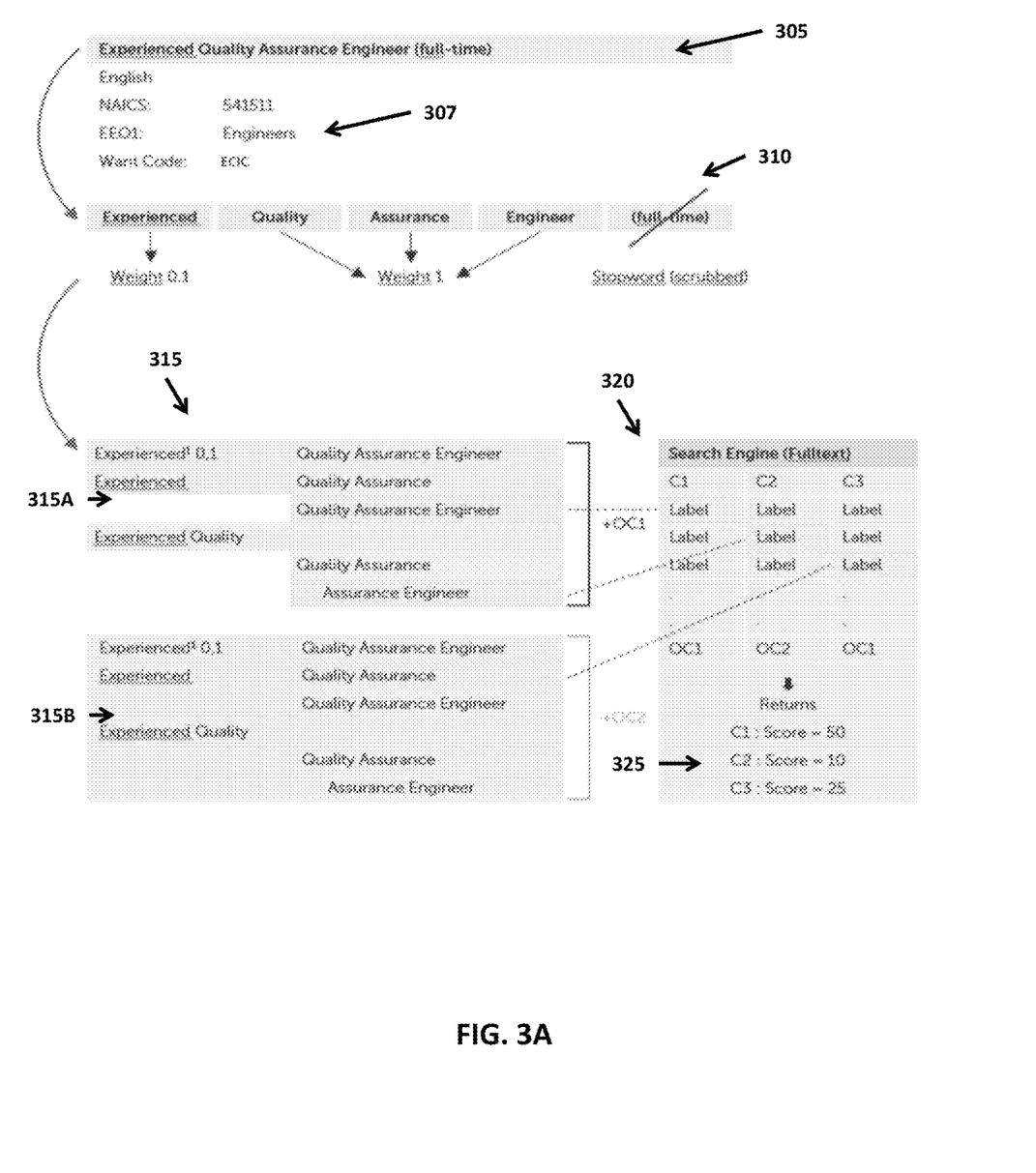
FIG. 3A is a conceptual diagram of the information generated at various stages of the exemplary method for classifying occupational data in accordance with at least one embodiment disclosed herein.
Figure 3B:
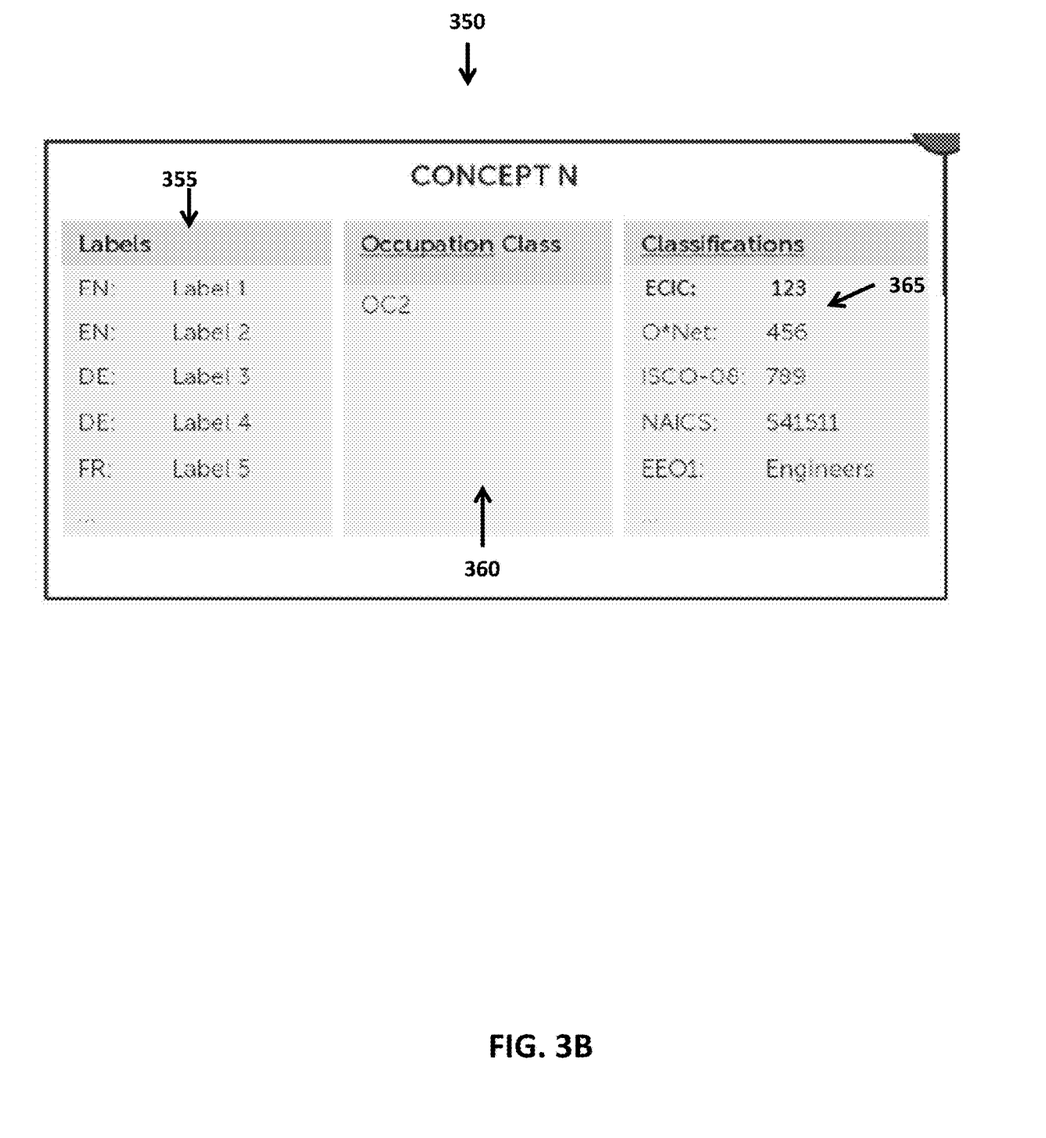
FIG. 3B is a detail view of an exemplary concept and its attributes, more specifically the different labels in multiple languages, the occupation class type and the classification codes in accordance with at least one embodiment disclosed herein.
Figure 3C:
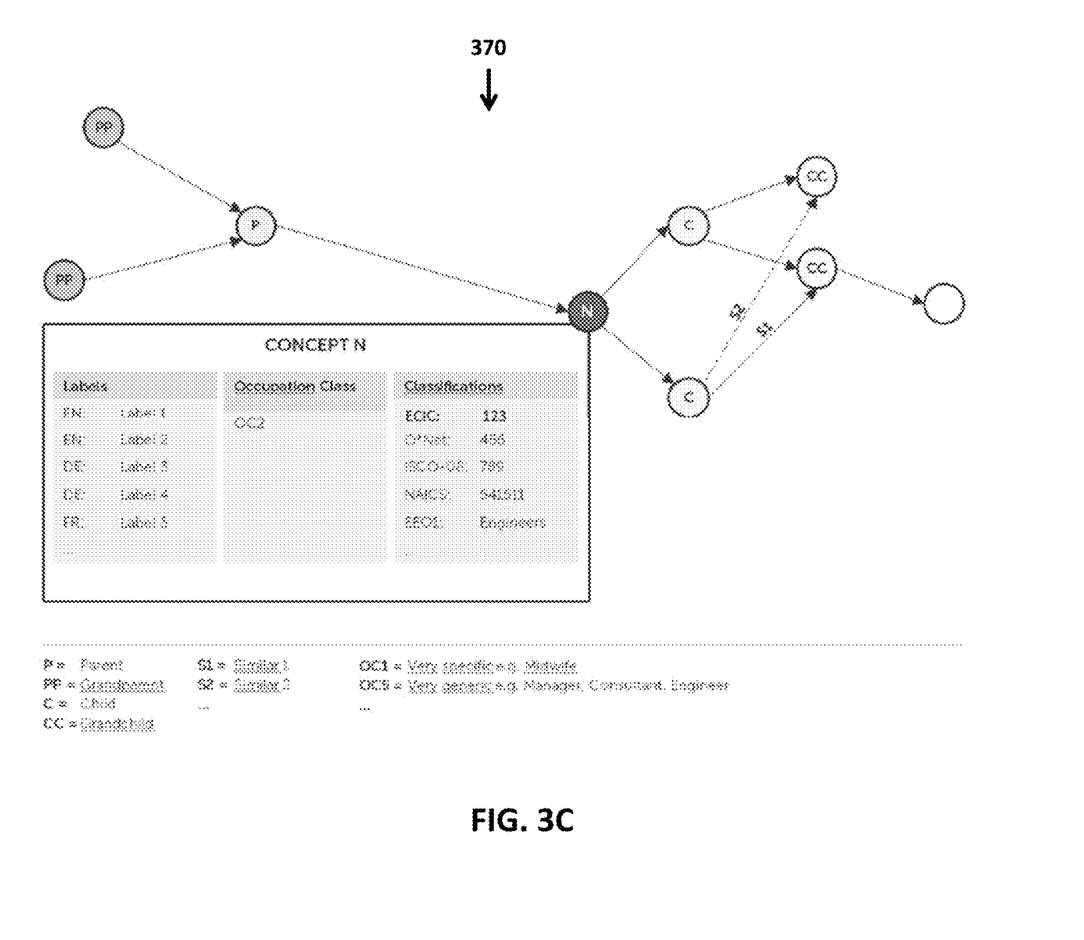
FIG. 3C is a diagram illustrating the relationships between concepts pointing to the different depth levels in a parent-child relationship between concepts (e.g. parent, grand-parent, etc.), whereby N is the start or source concept for classifying occupational data in accordance with at least one embodiment disclosed herein.
Figure 3D:
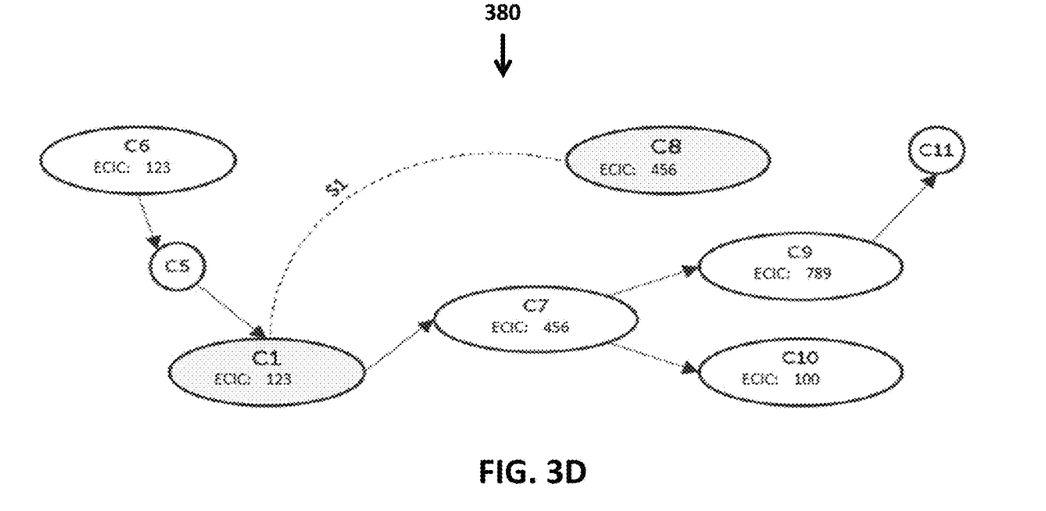
FIG. 3D is an exemplary concept graph which illustrates the interrelatedness of concepts through similarity (S1), here showing the similarity relation between C1 and C8, in accordance with at least one embodiment disclosed herein.

"Conceptual graphs" according to certain embodiments are a formalism for knowledge representation, that may form a logical system for the semantic description of knowledge. Conceptual graphs are often applied in the fields of artificial intelligence, computer science or cognitive science. Relations between two concepts can e.g. be displayed as follows: a [concept] is linked to another [concept] through a (relation), where concepts are graphically represented as rectangles, and relations as ovals. By way of further example, as shown in FIG. 3D, concepts can be represented as circles or ovals and the relations therebetween can be represented with arrows and lines.

The referenced systems and methods for classifying occupational data are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment or an embodiment combining hardware and software (including firmware, resident software, micro-code, etc.).

Figure 1:
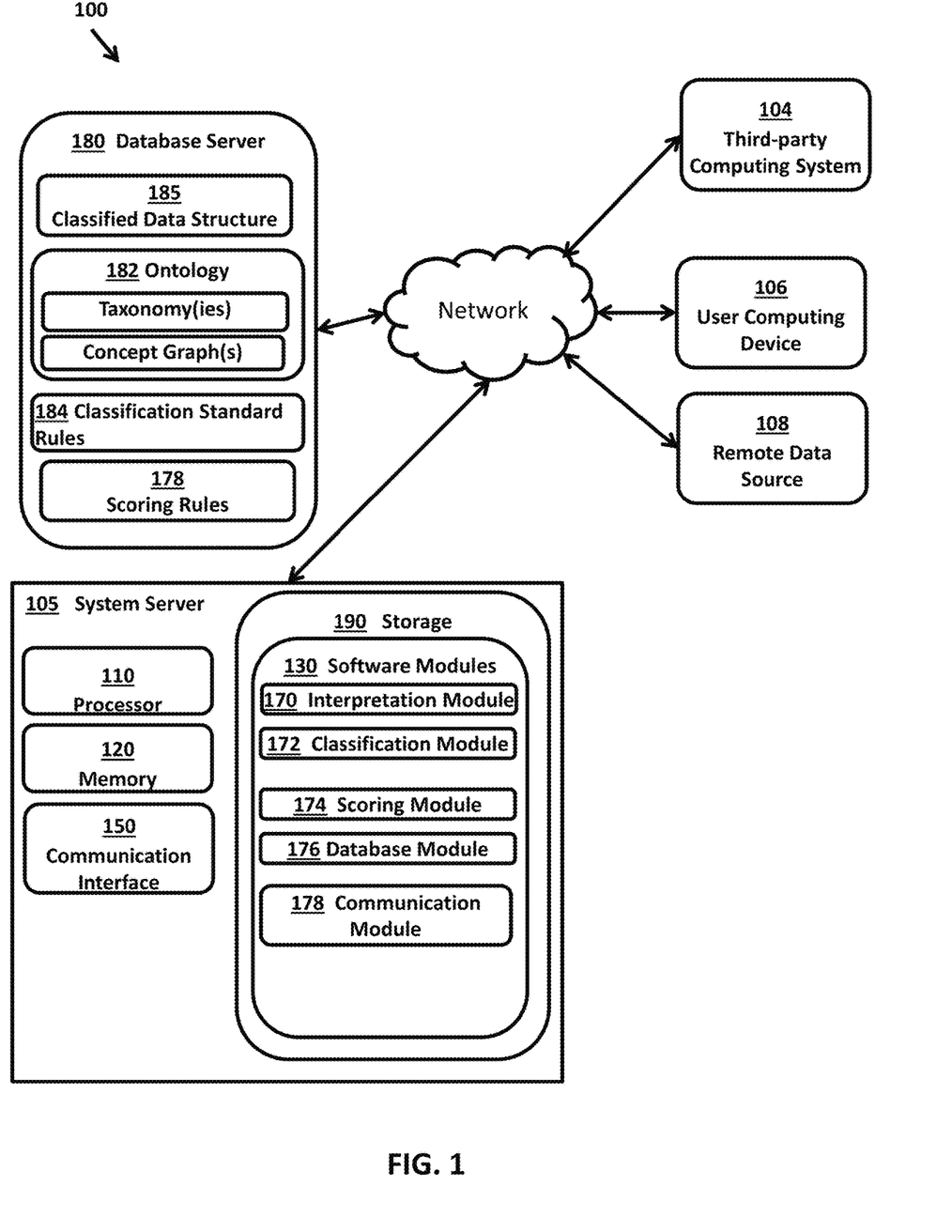
FIG. 1 is a high-level diagram illustrating an exemplary configuration of a system for classifying occupational data in accordance with at least one embodiment disclosed herein.

An exemplary computer system is shown as a block diagram in FIG. 1 which presents a high-level diagram illustrating a configuration of a system for classifying occupational data 100 in accordance with one embodiment of the present invention. In this arrangement, the system 100 consists of a system server 105 (referred to herein as the system server). Also shown are remote computing devices in communication with the system server 105 including a third-party computing system 104, and a user personal computing device 106. The system server and one or more of the other remote computing devices can also be in communication with one or more data storage devices, such as the database server 180 and a remote data source 108.

The system server 105 is intended to represent various forms of digital computing devices and/or data processing apparatus such as servers, blade servers, mainframes, and other appropriate computers and/or networked or cloud based computing systems that are capable of communicating with remote computing devices, data storage devices and computing networks, including receiving, transmitting and storing electronic information, as well as processing information as further described herein. The database server 180 and third-party system 104 are also intended to represent similar computing devices to implement respective functionalities.

User device 106 enables a user to interact with a remote computing device, such as system server 105 and database server 180 over the network, as shown. User device 106 can be any device capable of communicating with a server and receiving input directly from a user, for example, a personal computer, a tablet computing device, a personal digital assistant (PDA), a cell phone or other types of computing devices, as will be appreciated by persons skilled in the art.

The database server 180 can contain and/or maintain various data items and elements that are utilized throughout the various operations of the system 100. The information stored by the database server 180 can include, but is not limited to, information relating to one or more ontologies, taxonomies, classification systems and concept graphs representing any of the foregoing and associated information. The database server 180 can also store or otherwise maintain one or more sets of rules, including semantic interpretation rules and categorization rules that the processor 110 at the system server 105 can apply to evaluate data input into the system and classify such data according to one or more given classification systems, as further described herein. It should also be noted that, although database server 180 is depicted as being configured externally to the system server 105, in certain implementations, the database server 180 and/or any of the data elements stored therein can be located locally on the system server 105, or other remote computing devices, in a manner known to those of ordinary skill in the art.

The system server 105 is arranged with various hardware and software components that enable operation of the system 100, including a hardware processor 110, a memory 120, storage 190 and a communication interface 150. The processor 110 serves to execute software instructions that can be loaded into and from the memory 120. The processor 110 can comprise one or more processors, a multi-processor core, or some other type of hardware processor, depending on the particular deployment of the system.

Preferably, the memory 120 and/or the storage 190 are accessible by the processor 110, thereby enabling the processor 110 to receive and execute instructions stored on the memory 120 and/or on the storage 190. The memory 120 can be, for example, a random-access memory (RAM) or any other suitable volatile or non-volatile computer readable storage medium. In addition, the memory 120 can be fixed or removable. The storage 190 can take various forms, depending on the particular implementation. For example, the storage 190 can contain one or more components or devices such as a hard drive, a flash memory, a rewritable optical disk, a rewritable magnetic tape, or some combination of the above. The storage 190 also can be fixed or removable or remote such as cloud based data storage systems.

The one or more software modules 130 are encoded in the storage 190 and/or in the memory 120. The software modules 130 can comprise one or more software programs or applications having computer program code or a set of instructions for execution by the processor 110. Preferably, included among the software modules 130 is an interpretation module 170, a classification module 172, a scoring module 174, a database module 176, a communication module 178 that are executed by the processor 110. In this way, the software modules 130 are closely integrated with the operation and configuration of the physical hardware aspects of one or more implementations herein.

Such computer program code or instructions for carrying out operational aspects of the systems and methods disclosed herein can be written in any combination of one or more programming languages. The program code can execute entirely on the system server 105, partly on the system server 105, as a stand-alone software package, partly on the system server 105 and partly on a remote computer/ device (e.g., the database server 180), or entirely on the remote computing devices. In the latter scenario, the remote devices can be connected to the system server 105 through any type of network, including a local area network (LAN) or a wide area network (WAN), or the connection can be made to an external computing system (for example, through the Internet using an Internet Service Provider).

It can also be said that the program code of the software modules 130 and one or more of the non-transitory computer readable storage devices (such as the memory 120 and/or the storage 190) form a computer program product that can be manufactured and/or distributed in accordance with the present disclosure, as is known to those of ordinary skill in the art. It should be understood that in some illustrative embodiments one or more of the software modules 130 can be downloaded over a network to the storage 190 from another device or system, e.g., remote data storage 108, via communication interface 150 for use within the system 100. In addition, it should be noted that other information and/or data relevant to the operation of the present systems and methods can also be stored on the storage 190.

A communication interface 150 is also operatively connected to the processor 110 and can be any interface that enables communication between the system server 105 and external devices, machines and/or elements. Preferably, the communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting system server 105 to other computing devices and/or communication networks, such as private networks and the Internet. Such connections can include a wired connection or a wireless connection (e.g., using the IEEE 802.11 standard), though it should be understood that communication interface 150 can be practically any interface that enables communication to/from the system server 105.

Although the system 100 is described in reference to individual devices, such as the system server 105, it should be understood that the system is configured to interact with any number of computing devices, local and remote, providing data to and receiving information from such devices. It should be understood that any of the remote computing devices depicted in FIG. 1 can be in direct communication with one-another or the system server 105, indirect communication with one-another or the system server 105, and/or can be communicatively coordinated with one-another or the system server 105 through a computer network, such as the Internet, a LAN, or a WAN.

The operation of the system for classifying occupational data 100 and the various elements and components described above will be further appreciated with reference to the method for classifying occupational data as described below, in conjunction with FIGS. 2-3G.

Figure 2:
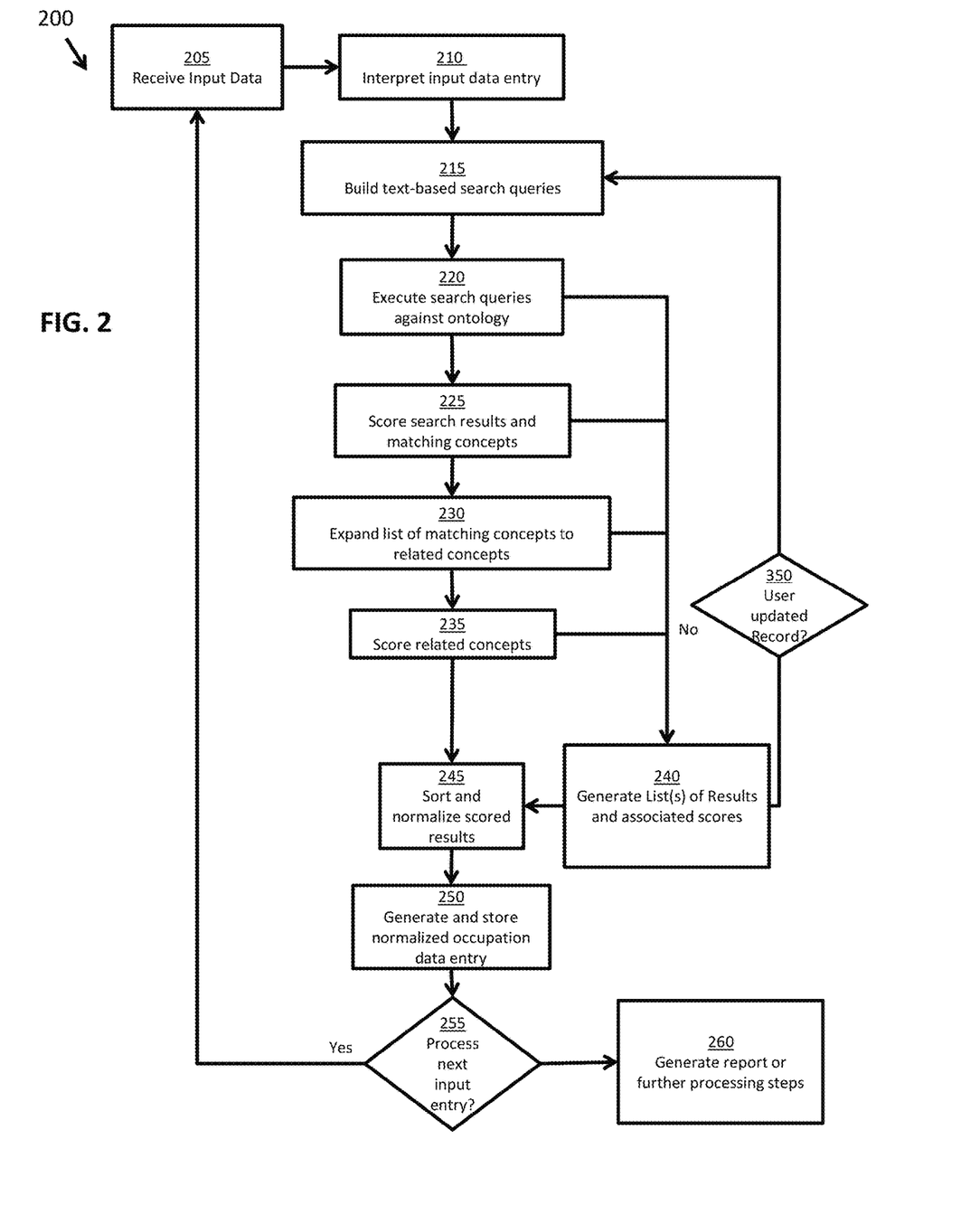
FIG. 2 is a flow diagram presenting a routine that illustrates broad aspects of a method for classifying occupational data in accordance with at least one embodiment disclosed herein.

Turning now to FIG. 2, the drawing depicted therein presents a flow diagram that illustrates a routine 200 for classifying entries in an occupational data set using the system 100 in accordance with at least one embodiment of the invention.

For example and without limitation, the routine 200 is further described herein in the context of a practical application for classifying a generally unstructured or semi-structured occupational data set according to a given classification system. The given classification system can be any one of a plurality of classification systems that, for example, can be defined by the user of the system 100 as a criterion for the classification process. The occupational data set is a compilation of individual occupational data entries (also referred to as items in the data set) that each include various pieces of information describing a respective occupation, say, the occupation of a respective employee at a particular company. In addition or alternatively, the occupational data set can comprise fewer entries, for example, a single entry of occupational data submitted to the system for classification. As noted, the manner in which the various occupations are recorded in the data-set and described generally does not strictly follow any standardized convention and therefore may limit the ability to perform meaningful analysis of the information. The broad end-goal of the exemplary classification process is to interpret and convert a given entry in a set according to a taxonomy and structures associated with a particular defined classification system and store the so-classified information in a new data-structure.

As should be understood by those of skill in the art, the classification process can be implemented by the system server 105, which can operate on one or more sets of data accessible to the system server, e.g., occupational data. For example and without limitation, the occupational data can be received at the system server in electronic file format from another computing device, such as third-party computing system 104, for maintenance in local storage 190. By way of further example, the system server can access a database of data, such as occupational data, that is stored on a remote computer, such as remote data source 108 or the database server 180. As would be further understood, the classification process is performed by the system server 105 using stored information describing one or more pre-defined classification systems, related ontologies, concept graphs and other such rules/conventions relating to respective classification systems. Similarly, the system server 105 can utilize semantic interpretation programs, language databases and other linguistic processing programs. One or more of the foregoing assets that inform the classification process can be stored by the system server 105 locally (e.g., in storage 190) and/or accessible to the system server from a remote computing device such as the database server 180, as shown in FIG. 1.

Generally, the classification process implemented by the system server 105 involves, for a given entry in a given occupational data set: interpreting the given entry, wherein interpreting can include interpreting a semantic description of the corresponding individual's occupation (e.g., a text-based job title or description) and any additional information from the entry (e.g., standardized descriptive codes that are specific to a particular classification system); analyzing the description and additional information according to an ontology of occupational concepts that have logical relation to a classification system of interest so as to identify concept(s) and any classification system-specific codes that are likely to correspond to the input occupation; expanding the list of concepts to include other concepts that have a salient relationship to the previously identified concepts; determining the "best" concept(s) and/or related classification system codes that most accurately correspond to the entry in the data set; and, finally, recording the information revealed through the foregoing analytical steps as an entry in a classified occupation data-set (referred to as the "classified data-set"), wherein each entry in the classified data set is structured and described according to the standards prescribed by the classification system(s) of interest. More specifically, the steps for creating each entry in the classified data-set can include selectively combining certain information obtained from the original entry (e.g., employee identifiers and the like), describe the employee's occupation in terms of the identified "best concept," and, optionally, further augmenting the entry with additional information inferred from the aforementioned analysis of the entry.

Returning now to FIG. 2, the routine 200 begins at step 205, where a particular entry in the unclassified occupational data set that describes a given individual's occupation is provided as an input at the system server 105. For example, the input can consist of a determining text string semantically describing the occupation, say, the semantic description "Experienced Quality Assurance Engineer (full-time)." The input could also specify the applicable language for the entry (e.g., English). Furthermore, the input entry can also include more standardized descriptors, such as codes that are specific to a particular classification system, an industry description, an occupation category description (e.g., NAICS code: 541511; EEO1:Engineers) or a custom classification system, which is referred to herein as "Exemplary Custom Internal Classification (ECIC)" For instance, "ECIC" can refer to a customized classification system that is specific to a particular organization and the rules and conventions associated therewith are defined in storage (e.g., the database server 180).

At step, 210, the entry is semantically interpreted by the system server 105, more particularly, by the server's processor 110, which is configured by executing one or more of the software modules 130, which may include the interpretation module 170. In one exemplary implementation, the text-based occupation description of the input entry is identified by the configured processor and semantically analyzed to identify relevant terms suitable for constructing search queries, which comprise the semantically relevant input terms in various combinations and sub-combinations, for subsequent searching against the defined concepts of the classification system stored in the database.

Interpreting the input string can include, according to certain embodiments, parsing the string into individual terms. In addition, terms matching a list of known "stopwords," which typically lack significance for classification can also be removed or excluded from the search strings built using the input terms. In addition, interpreting the string can also include weighting a given term positively or negatively based on how relevant the term is, wherein relevance is a measure of how significant or meaningful a term is to accurately understand an occupation title or description within the given context. The weighting of terms can be based on a list of known descriptive words having respective weights, wherein the list is stored in the database 180 and is specific to one or more classification systems or languages. The list can be manually generated and/or generated and updated by the system server 105 using a machine learning algorithm trained on a pre-defined training set of salient terms and updated periodically as additional data-set (s) are classified and verified for accuracy.

At step 215, the system server 105 defines text-based search queries by combining the terms identified and weighted at step 210 in various combinations and sub-combinations. FIG. 3A is a conceptual illustration of the input data as it is received, processed and manipulated in connection with steps 205 through 215. In particular, the input is shown as a data structure including a text-description field 305 and additional input fields 307. Individual terms 310 represent the parsed terms of the text-description that are scrubbed and weighted at step 210, as appropriate. FIG. 3A also illustrates a table 315 of the exemplary search queries built at step 215.

The search queries are searched against the information concerning the classification system stored, for example, in the database server 180, step 220. The searching step can be performed using the system server 105, more particularly, by the server's processor 110, which is configured by executing one or more of the software modules 130, including, preferably, the classification module 172. In one exemplary implementation, the search queries are searched against a stored ontology that represents the hierarchy of concepts within one or more occupation classification systems, the interrelationships between concepts and includes defined signifiers associated with respective concepts. A "concept" is a defined occupation in one or more classifications that can be expressed by known text-based labels and associated classification codes (e.g., ISCO-08: 789 etc.). Concepts can also be associated with other signifiers such as an occupation "class" code, which denotes a level of specificity for a given concept. For example, the class codes can range from "OC1" to "OC5" wherein OC1 denotes a specific occupation (e.g., midwife) and OC5 denotes a more generic occupation (e.g., manager, consultant, or engineer). For example and without limitation, FIG. 3B is a conceptual illustration of a concept "N" in the ontology that includes text-based labels 355 in various languages, one or more corresponding occupation class codes 360 (e.g., OC2), and one or more classification codes 365 associated with respective classification systems.

Accordingly, a given query can be searched against the text-based labels associated with respective concepts in the ontology for matches between one or more of the search terms. As noted, in the exemplary implementation described herein, all concepts in the ontology can have an associated occupation class. For example, OC1 level occupations are very specific (e.g. "Java Software Architect") and, as such, the tasks associated with the occupation are well-defined. By comparison, an OC5 level occupation is relatively vague (e.g., a "Manager") and, as such, further information, such as the corresponding industry, is typically needed in order to pin-point the exact occupation. Accordingly, the search queries can be run as a function of the occupation class and the results can be differentiated accordingly (e.g., queries matching more generic OC5 concepts can be discounted relative to query matches to specific OC1 concepts). For instance, the set of queries can be repeated for each occupation class and matches with OC1-level concepts being scored higher relative to matches involving more OC5-level occupation classes.

To better explain the foregoing searching step, FIG. 3A illustrates the two sets of queries, 315A and 315B, that are run for multiple occupation classes (e.g., query AND/+OC1, or query AND/+OC2). FIG. 3A also depicts a table of exemplary search engine results 320. For example, and without limitation, the table includes three exemplary concepts, C1, C2 and C3 having respective "labels" and occupation class codes thereunder. Furthermore, FIG. 3A also depicts exemplary matches between certain text-based queries and certain concept labels by drawing dashed lines between the particular text-based query and a given "label" of a concept.

In connection with executing the queries, step 220, the system server 105 can also be configured to score the search results at step 225. More specifically, results for each query can be scored based on how closely the query matches the sets of labels associated with respective concepts. In addition, the results for each query are also scored based on the significance weight associated with respective search term (s) in a given query, thereby discounting matches involving less probative search terms relative to the more probative terms. Furthermore, as noted, query matches can also be weighted according to the occupation class associated with any matching concepts.

In addition to scoring individual query matches, search results can be compiled to determine a representative score for a given concept. For instance, in one exemplary implementation, the search results from the individual queries can be grouped by concept (e.g., individual queries resulting in a match with a label for concept C1 are grouped together), and the maximum score for any single query can be used to represent the overall match score for a given concept. For example, FIG. 3A further illustrates a list 325 of concepts C1-C3 and compiled scores 50, 10, 25, respectively.

Steps 205 through 225 have been generally directed to classification of the input text by text-based searching for concepts in the ontology that have matching or similar labels/descriptors. However, according to a salient aspect of the exemplary classification systems and methods described herein, the accuracy of the classification can be improved and the classification results enhanced through expansion of the text-based searching results according to the relationships between concepts in the ontology. In particular, at step 230, the system server 105 searches the ontology for concepts having a prescribed relation to any one of the previously identified concepts (e.g., C1, C2 and C3) through a process generally referred to as "graph exploration."

As noted, the ontology represents the hierarchy of concepts within one or more occupation classification systems and, importantly, the interrelationships between concepts and a concept graph is an exemplary logical representation of the interrelationships between concepts in the ontology. FIG. 3C is a simplified illustration of an exemplary concept graph 370 comprising a directed graph of concept nodes, each corresponding to a respective concept. For simplicity, the concept graph 370 specifically labels only one concept, "concept N", and the remaining nodes are labeled and tied together by directional arrows according to their direct or indirect relationship with N. In the exemplary concept graph shown, the concept nodes are related to each other through two possible types of relationships, hierarchy and similarity. The hierarchical relationships are described in terms of parent/child relationships, wherein more specific concepts are referred to as "children" and more generic concepts are referred to as "parents." As shown in FIG. 3C parent nodes are labeled "P," grand-parent nodes "PP," children nodes "C" and grandchildren nodes "CC." FIG. 3C also illustrates the similarity between certain nodes using an arrow and associated similarity values (e.g., S2, S1 etc.) wherein the numerical value corresponds to a degree of similarity between concepts (e.g., value 1=90% similarity and 5=15% similarity).

Continuing with the exemplary practical example described in connection with FIGS. 3A and 3B, at step 230, the system server's processor 110, which is configured by executing one or more of the software modules 130, including, preferably, the classification module 172, can search a concept graph stored in the database 180 to identify concepts having one or more prescribed relationships to one or more of concepts C1, C2, C3. The prescribed relationship can be a pre-defined hierarchical relationship, e.g., concepts that are either directly related or once removed from a given concept (e.g., parents, grandparents, children, and grandchildren). In addition or alternatively, the prescribed relationship can be a given similarity, say, concepts having a level 1 similarity (e.g., 90% similarity) to a given concept.

FIG. 3D is an exemplary concept graph 380 depicting concept nodes that have either a direct or once-removed hierarchical relationship with concept C1 or a level 1 ("S1") similarity relationship with C1. As shown, some of the concepts in the graph are also associated with a respective ECIC code. Accordingly, through analysis of the exemplary concept graph associated with concept C1, the list of concepts that are potentially relevant to the original input can be expanded to include C1's parent C5, grandparent C6, child C7, and grandchildren C9, C10. In addition, the expanded list of concepts can also include concept C8, which is not hierarchically related to C1 but has the prescribed similarity relationship S1. It should be understood that the graph exploration step can be performed for each of the previously identified concepts, e.g., C1-C3, or a subset thereof selected according to score and other such selection criteria. Furthermore, the information relating to the concepts identified through graph exploration and the codes associated therewith, respectively, such as ECIC codes can be compiled into a list and those concepts and related codes can be scored, as further described herein.

According to a salient aspect of certain embodiments of the present invention, the routine 200 including the graph exploration step accounts for the possibility that, in some cases, there are concepts which are very similar to a particular concept (referred to as "same but different" concepts) and which may not be identified due to limitations imposed by conventional text-based search using only keyword matching. In other words, the exemplary classification algorithms disclosed herein utilize the relationships between concepts to reveal additional, potentially relevant concepts, thereby enhancing the classification results and minimizing the possibility of excluding concepts that might closely correspond to the occupation input into the system. As a practical example of "same but different" concepts, concept C8 in the graph 380 could represent the occupation "Production Assurance Engineer" and concept C1 represents the occupation "Quality Assurance Engineer."

In connection with the graph exploration step 230, the system server 105 can also be configured to score the related concepts at step 235. In one exemplary implementation, the score for a related concept can be calculated for each related concept based on the respective source concept's score and the particular type of relationship there-between. For instance, concepts having a familial relationship with a source concept can be scored by multiplying the score assigned to the source concept by a configurable factor that is defined according to the respective familial relationship (e.g., parent vs. child) and/or distance from the source concept (e.g., direct connection, once removed, etc.). By way of further example, concepts identified as having a similarity-based relationship with a given source concept can be scored by multiplying the source concept's score by a configurable factor defined according to the degree of similarity with the source concept.

It can be appreciated that the ontology can be defined to associate (e.g., logically map) a given concept to one or more standardized codes in any number of different classification systems including, for example, NAICS and EEO1 and, by way of further example, an ECIC code, wherein ECIC refers to a customized classification system (taxonomy) that is specific to a particular user of the system (e.g., a particular organization). Depending on the coding convention (e.g., Rules 184) of a given classification system, the concepts in the ontology can be associated with codes from the given classification system in a one-to-one correspondence, or a one to many correspondence (e.g., a more generic occupation concept can be associated with a range of codes for a given classification system). Moreover, the user of the classification system 100 can define settings causing the classification routine 200 to be executed with specific attention to one or more classification systems that the user desires to re-define the occupational data according to.

In view of the foregoing, the results generated and output at various steps of routine 200 can be scored in one or more dimensions. More specifically, the results returned by the system server 105 can include concepts, classification system codes (e.g., NAICS, EEO1 and/or ECIC codes) and the like. A score for how accurately a given result represents the input data entry (e.g., a confidence measure) can be calculated for one or more of these results, individually. Moreover, because some results can be logically associated with others, scores can be calculated as a function of the scores assigned to related results. For instance, the score of a given concept can be calculated as a function of the score calculated for a classification code that is associated with that concept, and vice versa.

Accordingly, in some implementations, the processor 110 at the system server, which is configured by executing one or more of the software modules 130, which may include the scoring module 174 and the database module 176, can be configured to generate and store information concerning the concepts and any associated classification codes (e.g., NAICS, EEO1 and/or ECIC codes) identified according to the classification method 200, in one or more separate or combined tables or lists.

Such lists can also include any scores that are calculated for respective concepts and/or classification codes. For instance, the system server 105 can store a list of concepts identified through the text-based search and respective scores generated for those concepts, as discussed at steps 220 through 225. The system server 105 can also store a list of "ECIC" codes that are logically associated with the foregoing concepts in the ontology. Similarly, the individual ECIC codes can be assigned scores that are also reflected in the list. For instance, as discussed at steps 220 through 225, the score assigned to a given concept returned from the text-based search can be assigned to the ECIC code(s) associated with the given concept.

Figure 3E:
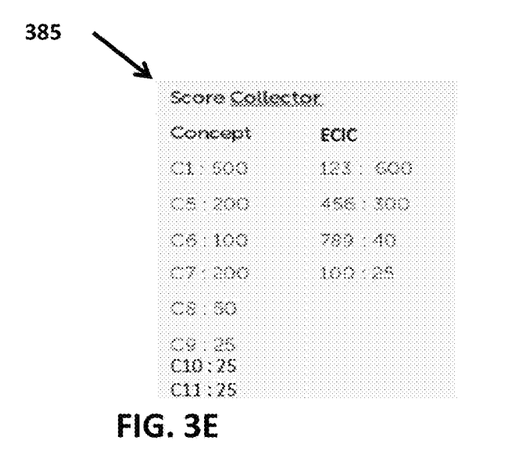
FIG. 3E is an exemplary table of scores for a given set of concepts generated in accordance with at least one embodiment disclosed herein.

Similarly, the system server 105 can be configured to store information concerning the related concepts identified through the graph exploration step 230 and any related classification codes, say, ECIC codes associated with the related concepts, in one or more lists. For instance, FIG. 3E is an exemplary table of scores. It contains the calculated score for the concepts C1-C11, giving the highest score to the concept C1, and additionally showing ECIC codes rating. The scores are being calculated for respective results at step 235. As shown, the table can include a list identifying the relevant concepts and their respective scores as well as a list of identified ECIC codes and their respective scores.

In addition, if a given code, say an ECIC code, is associated with multiple concepts, the score assigned to the ECIC code can be increased by a configurable factor that is defined as a function how many concepts the particular code is associated with. For example, in the first instance a given ECIC code is identified, the code score=+100% of original score (e.g., the score assigned to the concept associated therewith), in the second instance, the score can be increased by +20% of the original score, in third instance, the score can be increased by +5% of the original score, and so on.

As noted above, the input entry from the unclassified occupational data set can, optionally, include codes relating to one or more classification systems (e.g., NAICS, EEO1, ECIC) referred to as "input classifications." Accordingly, the identified concepts can also be scored as a function of whether those concepts are also associated with any input classifications included in the input entry. As noted, input classifications are values that may exist in the customer data, such as an identification of a particular industry, salary, ISCO-08 or NAICS code and the like. Such standardized descriptors can similarly have a known association with one or more of the concepts in the ontology. Accordingly, the system server 105 can be configured to compare any received input classifications with corresponding classification codes associated with the identified concepts and score the relatedness of the concepts to the original occupational data accordingly, thereby further refining and ranking the classification results.

Figure 3F:
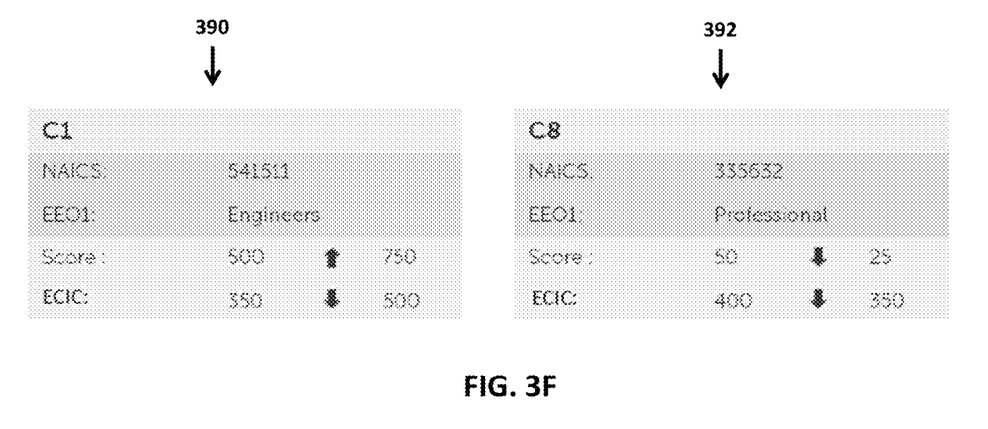
FIG. 3F are exemplary tables of generated scores showing the scores before and after a boost process, which elevates or decreases the scores depending on additional factors (e.g. proximity to a specific classification code, etc.) in accordance with at least one embodiment disclosed herein.
Figure 3G:
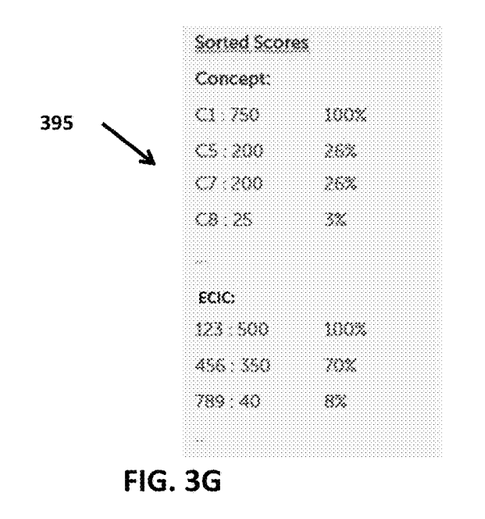
FIG. 3G are exemplary tables of final scores after the application of any boost, and corresponding normalized values in percent generated in accordance with at least one embodiment disclosed herein.

More specifically, for a given concept returned by the foregoing steps, the system server can determine whether a given concept has a classification and value associated therewith. Provided the given concept has a classification and a value, the classification and value can be compared to the "input classifications" and any match or mismatch there-between can be used by the system server to adjust the overall score for the given concept accordingly. For instance, continuing with the practical example, wherein the input includes the text "Quality Assurance Engineer" and included an input classification code "ISCO-08: 123" and the text-based or relational analysis identified the matching concept C1, the system server 105 can be configured to determine whether concept C1 in the ontology includes an ISCO-08 code and, if so, whether that code is 123. FIG. 3F is a conceptual illustration of tables of information and calculated scores that can be recorded for exemplary concepts C1 390 and C8 392. As shown the table 390 of information relating to concept C1 can include a calculated score of 500 and also reflect the positive adjustment of the score to 750. In addition, the "score card" for concept C1 can also identify classification codes, such as ECIC code 123, and a corresponding calculated score 350 and adjusted score of 500.

Various algorithms for adjusting the score of a given concept based on matching an input classification code with the given concept's classification code(s) can be utilized depending on the applicable classification(s). As should be understood by one of skill in the art, each classification has a different structure and coding convention, for example, NAICS utilizes a 6-digit number, wherein each digit starting from the left represents a level, such that the more digits that match between two codes, the more closely related the two codes and the corresponding occupations are. For example, NAICS code 541611 is very similar to 541612, somewhat similar to 541620, and dissimilar to 541713. Accordingly, the system server can be configured to increase or decrease the score of a given concept by an amount that varies as a function of how closely the concept's classification code matches any input classification code values and as a function of the stored coding convention/rules for the classification system. Furthermore, the system server can be configured to similarly adjust the scores for any related concepts configurable positive or negative amounts depending whether there was a match or partial match and how closely the match is.

The foregoing is just one non-limiting set of scoring methodologies that may be used by the system server 105 to score and rank the results returned through text-based searching and graph exploration operations. Through calculating scores for the identified concepts and/or specific classification codes individually and adjusting the scores (e.g., applying configurable positive or negative score "boosts") based on one or more of the inter-relatedness of results and the relation to the original input entry, the system server can effectively determine if related concepts are relevant even though they might not have appeared in the text-based search step 220. Furthermore, for all identified concepts, including those returned as search results and those related to the search results, the system server is applying the exemplary score boosts so as to bring the most relevant concepts to the top of the score-based ranking of concepts.

The system server's processor 110, which is configured by executing one or more of the software modules 130, which may include the scoring module 174, can sort the scored results according to their respective scores, step 245. As can be appreciated, the score that the system calculates for a given result is a measure of how closely the result corresponds to the original input entry or, in other words, a confidence level representing how likely the result accurately represents the original input entry. Accordingly, a compiled list of concepts can be sorted/ranked from best concept to worst based on the respective scores. Similarly, the list of classification codes, such as ECIC codes, can be sorted/ranked from best to worst based on the respective scores. It should be appreciated that any number of different types of results produced using the exemplary classification algorithm can be sorted by score to generate a type-specific ranking (e.g., to identify each of the best concept, best ISCO-08 code, best NAICS code, best ECIC code, etc.).

In addition, because different result types can be scored according to different scoring methodologies, the system server 105 can be further configured to normalize the scores according to a common scale, thereby allowing for the ranking and comparison of results irrespective of type. By way of example and without limitation, the system server can apply a logarithmic normalization function which translates the scores into a 0-100% range. FIG. 3G is an exemplary table of sorted results including the best four concepts and best three ECIC codes. Also shown are the respective raw score and normalized score.

The system server's processor 110, which is configured by executing one or more of the software modules 130, which may include the database module 176, can generate an entry in a classified occupation data-set, according to the scored and ranked results, step 250. As noted, the classified data-set and the individual entries generated by the system server 105 can be structured and described according to the standards prescribed by the classification system(s) of interest and other prescribed rules. In some configurations the system server can modify and/or overwrite the original input entry, however, preferably, the system server generates an entirely new classified data-set, wherein the new classified data entry effectively is a new, augmented and enhanced set of information that corresponds to the original input entry.

In one or more implementations, the steps for creating an entry in the classified data-set (referred to as the "classified entry") can include selectively combining certain information obtained from the original input entry with information gathered through the aforementioned steps of the routine 200, thereby modifying, supplementing, enhancing and improving both the informational content and structure of the data set. For example, a specific employee identifier or any classification-specific codes included in the input entry can be stored in a respective field of the classified entry. In addition, the step for creating the entry can also include semantically describing the employee's occupation according to the specific description for the best concept. Similarly, information relating to the best classification code (e.g., best ISCO-08 and ECIC codes), as determined by the system server according to the foregoing routine 200, can be stored in respective fields of the entry.

In addition to the foregoing, additional standardized descriptors that are associated with one or more of the best classification results (e.g., concepts, classifications and the like), such as a relevant industry, occupation class, salary class, and the like can be incorporated into the classified entry, thereby augmenting the entry with additional information inferred from the aforementioned analysis of the entry and the ontology. It can be appreciated that the scope of the data that is inferred from the classification results and incorporated into the classified entry can be limited according to the respective score of the result such that only closely related, high-confidence, results are used to augment the classified entry and thereby ensures only reliable information is incorporated into the data entry.

It should be further understood that the foregoing steps of routine 200 can be repeated for any additional occupational data entries that might be included in the unclassified data-set provided as the input to the system 100, step 255. Furthermore, subsequent to classification of the unclassified input data, at step 260, the system server 105 can be configured to perform any number of further actions utilizing the classified input data such as generating reports.

In one exemplary application, the system server processor 110, can output information concerning one or more classified entries generated according to the steps of routine 200. For instance, the output can be a report providing an accurately classified and standardized description of a particular employee's occupation that is output via an associated display device or electronically transmitted to a third-party computing system (e.g., as an email or electronic file) for display or storage by the third party. By way of further example, the output can be a report detailing a plurality of entries that can be electronically transmitted to the human resource department of the company that provided the original unclassified data-set. In addition or alternatively, the subsequent steps performed by the system server 105 using the classified data set can include additional data-analytics algorithms such as clustering, grouping and benchmarking operations.

As noted, it can be appreciated that, through the specific technical solution for classification and standardization, the disclosed embodiments translate relatively unstructured and unstandardized occupation data sets, which are inherently difficult for a computers employing existing data-processing and analytical systems to understand and therefore are not suitable for deeper data-analysis, into an occupation data set that is accurately and more precisely structured according to one or more defined classification systems. Thus, the disclosed embodiments are specifically configured to generate new and enhanced sets of occupational data that are more meaningful in multiple dimensions for at least the reason that they are richer in information than the original data set and are suitable for further data-analytics processes such as benchmarking, matching or statistical analyses, thereby allowing even deeper and more meaningful insights to be drawn therefrom.

The automated solution provided in accordance with embodiments of the invention provides efficiency in the fields of data storage and data analysis, specifically, classification and a more optimized use of computer resources necessary as part of the analytical process. This automated solution, rooted amongst a computer and network-centric arrangement including, by a hardware processor and other machine interaction over a network, facilitates the creation of occupational data sets through the algorithmic analysis of the unstructured received information, selective recordation or translation of information contained therein according to specific classification systems and related criteria, and further augmentation of the received information and thereby transforms unclassified and unstructured information concerning occupation descriptions into sets of accurate, precise, standardized occupation information that not only exceeds the utility of the input information but is also in a condition for deeper levels of analysis and processing.

The exemplary systems and methods for classification described herein can be applied in any number of practical scenarios. In one illustrative use-case, the classifier system 100 could be used within a Public Employment Service that processes unemployed job applicants, each providing various credentials and unique representations of their experience in any number of different formats (e.g., cryptic job titles, company-specific, industry-related or often unknown abbreviations etc.). Accordingly, the PES employee can enter the applicant's information, job-title, etc. into a portal/interface with the exemplary classifier system 100, which "decrypts" the otherwise cryptic set of input information using the exemplary classification methods described herein and generates accurate and precisely classified data-points that provide a meaningful understanding of each prior job experience for the applicant and store the applicant's normalized and classified data in the system. Moreover, after classification, the processing system (e.g., system server 105) can execute search functions operating on a database of similarly classified open job positions to accurately identify which positions could be offered to the applicant and further determine, according to the ontology, how related the applicant's former experience(s) are to respective open positions in the portal.

In another illustrative use-case, the classifier system 100 can be used by a human resources department of a large organization for classification of the entire workforce's occupational data and, subsequently apply analytics, searching and statistical analysis algorithms to, cluster, group and benchmark employees as would be understood by those in the field.

On a larger scale, the exemplary systems and methods for classifying 100 can be executed on disparate types of occupation data, say, two sets of occupation data defined according to two different classification systems, so as to convert the different classification system data-sets to a common paradigm (e.g., a common set of concepts) and thereby enabling additional benchmarking, comparative analytics and other such operations to be performed across classification systems.

At this juncture, it should be noted that although much of the foregoing description has been directed to exemplary systems and methods for classifying occupational data and exemplary practical use-cases, the systems and methods disclosed herein can be similarly deployed and/or implemented in scenarios, situations, and settings far beyond the referenced scenarios.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for assessing a degree of risk in a prescribing behavior record. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for classifying an unstructured data set according to a classification system, the method comprising:
   interpreting a semantic description for a given item of unstructured data in the unstructured data;
   analyzing the semantic description in accordance with an ontology of concepts to identify a list of one or more concepts related to the given item from among the ontology of concepts;
   expanding the list of concepts to generate an expanded list that includes other concepts from among the ontology of concepts that have a relationship to the one or more concepts in the list;
   determining, from the expanded list, one or more concepts that correspond to the given item; and
   recording at least one of the one or more determined concepts as an entry in a classified data-set, wherein the entry in the classified data set is structured in accordance with standards prescribed by a given classification system of interest.

2. The method of claim 1 wherein analyzing at least the semantic description comprises:
   parsing the semantic description into individual terms; and
   analyzing combinations of the individual terms in view of an ontology of concepts that have logical relation to a classification system of interest.

3. The method of claim 1, wherein recording comprises structuring the classified data set in accordance with standards prescribed by a plurality of classification systems of interest.

4. The method of claim 1, comprising:
   generating one or more scores for attributes of the one or more concepts in the expanded list;
   elevating one or more of the scores as a function of additional factors; and
   normalizing the scores to provide a respective confidence score for the one or more concepts in the expanded list.

5. A system for classifying an unstructured data set according to a classification system, the system comprising:
   a database module that configures a processor to access one or more items of unstructured data in the unstructured data set, an ontology of concepts, and standards prescribed by a given classification system of interest;
   an interpretation module that configures the processor to interpret a semantic description for a given item of unstructured data in the unstructured data set;
   a classification module that configures the processor to, for the given item of unstructured data:
      analyze the semantic description in accordance with the ontology of concepts to identify a list of one or more concepts related to the given item from among the ontology of concepts,
      expand the list of concepts to generate an expanded list that includes other concepts from among the ontology of concepts that have a relationship to the one or more concepts in the list, and
      determine, from the expanded list, one or more concepts that correspond to the given item; and
   wherein the database module further configures the processor to record the one or more determined concepts as an entry in a classified data-set, wherein the entry in the classified data set is structured in accordance with standards prescribed by a given classification system of interest.

6. The system of claim 5 wherein the one or more items of unstructured data are unstructured occupational data items.

7. The system of claim 5 wherein the processor is configured to determine related classification system codes that most correspond to the one or more concepts determined to correspond to the given item.

8. The system of claim 5, wherein the processor is configured to structure the classified data set in accordance with a plurality of classification systems of interest.

9. The system of claim 5, comprising a scoring module that configures the processor to score the one or more concepts in the expanded list.

10. The system of claim 9, wherein the scoring module configures the processor to score the one or more concepts in the expanded list by:
   generating one or more scores for attributes of the one or more concepts in the expanded list;
   elevating one or more of the scores as a function of additional factors; and
   normalizing the scores to provide a respective confidence score for the one or more concepts in the expanded list.

* * * * *